United States Patent [19]

Biancardi

[11] 4,307,424

[45] Dec. 22, 1981

[54] TELEVISION PROJECTOR AND STAND DEVICE AND METHODS OF MAKING AND USING THE SAME

[76] Inventor: Joseph L. Biancardi, 368 Chez Paree, Hazelwood, Mo. 63042

[21] Appl. No.: 87,310

[22] Filed: Oct. 22, 1979

Related U.S. Application Data

[63] Continuation-in-part of Ser. No. 854,699, Nov. 25, 1977, Pat. No. 4,171,883.

[51] Int. Cl.³ ............................................. H04N 5/74
[52] U.S. Cl. .................................. 358/237; 358/250; 358/254
[58] Field of Search ............... 358/60, 231, 237, 250, 358/254; 353/66, 98, 119

[56] References Cited

U.S. PATENT DOCUMENTS

| 1,616,747 | 2/1927 | Harnett | 353/66 |
|---|---|---|---|
| 2,239,728 | 4/1941 | McEnery | 248/346 |
| 2,395,975 | 3/1946 | Schwanhausser | 353/66 |
| 2,735,336 | 2/1956 | Bersudsky | 353/98 |
| 3,820,885 | 6/1974 | Miller | 353/98 |
| 3,949,167 | 4/1976 | Koyama et al. | 358/237 |
| 4,058,837 | 11/1977 | Muntz | 358/237 |
| 4,066,231 | 1/1978 | Bahner et al. | 248/13 |

*Primary Examiner*—Robert L. Richardson

[57] ABSTRACT

The present invention relates to a combination projector and television stand which allows the picture from a conventional television set to be magnified and projected upon a suitable surface and includes a stand provided with mounts which allows a conventional television set to be mounted thereon at a particular angle from the horizontal and a reflector and projector disposed proximate the face of television set which provides an angularly disposed reflected image from the reflector surface and transmits the image through an aperture in the projector to a suitable display surface.

1 Claim, 2 Drawing Figures

TELEVISION PROJECTOR AND STAND DEVICE AND METHODS OF MAKING AND USING THE SAME

BACKGROUND OF THE INVENTION

This application is a continuation-in-part of applicant's previously filed application Ser. No. 854,699, filed Nov. 25, 1977, and now U.S. Pat. No. 4,171,883.

Since the advent of television many have attempted to provide a projector system and devices which would accept the picture on a conventional television picture tube and transmit same in magnified form upon a suitable display surface.

Devices in the past have been of such complexity and expense that many potential users have been unable to afford them. Some projectors, while apparently solving the problem require the television set to be disposed in an awkward and unattractive configuration or require relatively expensive modifications to the television set.

SUMMARY

It is therefore an object of the present invention to provide a television stand and projector device which includes a stand which allows the television to be conveniently mounted at a particular angle and a projector which allows the television picture to be reflected and transmitted upon a proper surface in proper orientation.

An object of the present invention is to provide such a device which provides high quality projection and magnification in a simple, attractive convenient arrangement without modifying or misusing the television set.

A further object of the present invention is to provide such a device which is simply and economically manufactured and used.

These together with other objects and advantages which will become subsequently apparent, reside in the details and construction and operation as more fully hereinafter described and claimed, reference being had to the accompanying drawings forming a part hereof, wherein like numerals refer to like parts throughout, and in which;

DETAILED DESCRIPTION OF THE INVENTION

Figure 1:
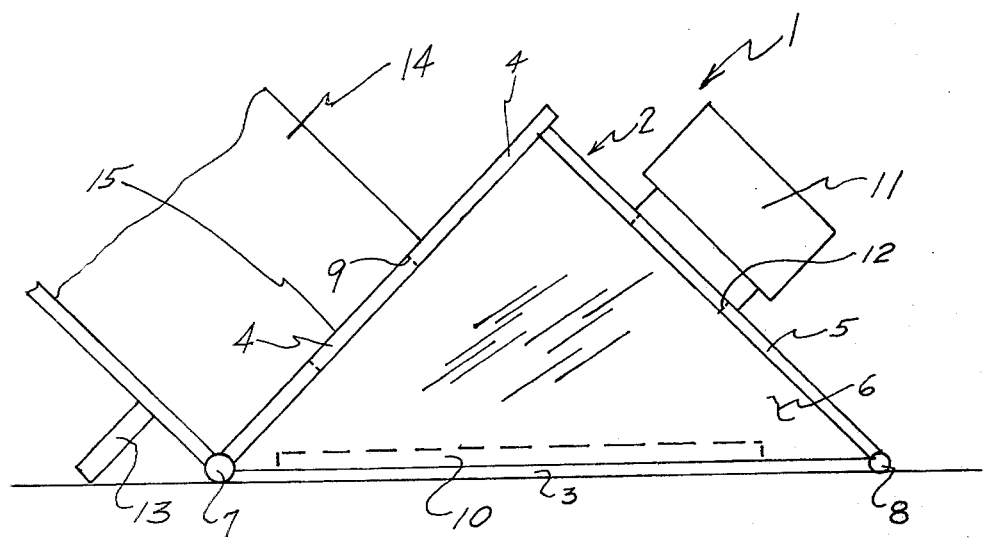
FIG. 1 is an elevation view of a projector and stand device constructed in accordance with and embodying the present invention.

Referring now in more detail and by reference characters to the drawings which illustrate practical embodiments of the present invention, FIG. 1, is a perspective view of a stand and projector device, 1, constructed in accordance with, used in and embodying the present invention.

As shown in FIG. 1, stand and projector device, 1, comprises housing, 2, is formed by base, 3, panel, 4, panel, 5, and side drapes, 6. Panel, 4, is pivotally mounted to hinge, 7, and thereby to base, 3. Panel, 5, is pivotally mounted to hinge, 8, and thereby to base, 3. Side drapes, 6, are constructed of a collapsible material in the preferred embodiment and in another embodiment are rigid and removably mounted. A feature of the device is that by rotating panel, 5, clockwise in FIG. 1 then panel, 4, may be laid on base, 3, and then panel, 5, may be laid on panel, 4, allowing complete collapse for storage. Panel, 5, supports panel, 4, in the position shown in FIG. 1. Panel, 4, is provided with inlet opening, 9, reflective surface, 10, lens, 11, and projector aperture, 12.

Figure 2:
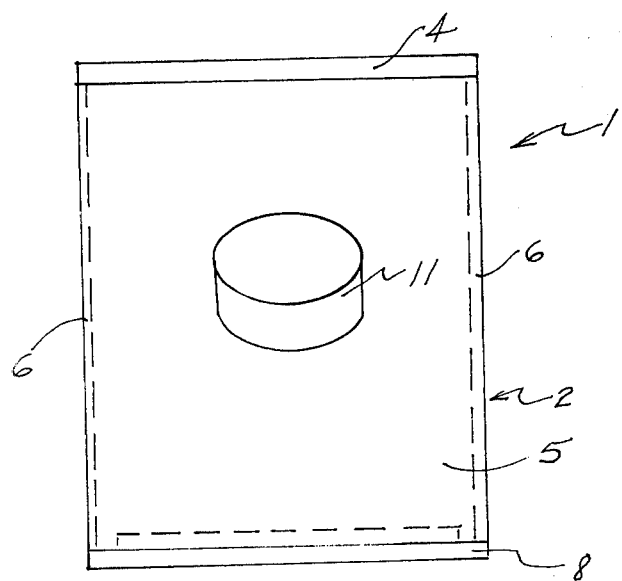
FIG. 2 is another elevation view of a projector and stand device constructed in accordance with and embodying the present invention.

FIG. 2, illustrates another elevation view of device, 1, shown in FIG. 1.

In operation, device, 1, which is provided with television stand, 13, is set up as shown in FIG. 1 with a television set, 14, mounted thereon. In operation the television picture from face, 15, of set, 14, is caused to be reflected by surface, 10, through lens, 11, and projector aperture, 12, to an appropriate wall or screen not shown but disposed to the right of device, 1, in FIG. 1.

It should be understood that changes and modifications in the form, construction, arrangement, and combination of the television stand and projector device and methods of making and using the same may be made and substituted for those herein shown and described without departing from the nature and principle of my invention.

Having thus described my invention, what I claim is new and desire to secure by United States Letters Patent is:

1. A television projector and stand comprising,
base means, comprising an essentially rectangular flat sheet,
a pair of angular mounting means operably mounted at opposite ends thereof,
a first panel operably mounted to one said angular mounting means,
a second panel operably mounted to the other angular mounting means, said first and second panels operably joined together, forming a triangle with said base means,
projector means operably mounted on said first panel and disposed proximate said angular mounting means, said projector means comprising,
housing means,
a reflective surface operably mounted in said housing,
movable lens means operably mounted in said housing means, said housing means provided with a projector aperture,
stand means operably coupled to said angular mounting means to which is mounted said first panel.

* * * * *